March 21, 1961 E. E. HESTON 2,975,475
SHEETING DIE
Filed July 20, 1956 3 Sheets-Sheet 1

INVENTOR.
EUGENE E. HESTON
BY
Oberlin + Limbach
ATTORNEYS.

March 21, 1961  E. E. HESTON  2,975,475
SHEETING DIE
Filed July 20, 1956  3 Sheets-Sheet 2

INVENTOR.
EUGENE E. HESTON
BY
Oberlin & Limbach
ATTORNEYS.

March 21, 1961   E. E. HESTON   2,975,475
SHEETING DIE
Filed July 20, 1956                     3 Sheets-Sheet 3

INVENTOR.
EUGENE E. HESTON
BY
Oberlin & Limbach
ATTORNEYS

United States Patent Office 2,975,475
Patented Mar. 21, 1961

2,975,475

SHEETING DIE

Eugene E. Heston, Akron, Ohio, assignor to National Rubber Machinery Company, Akron, Ohio, a corporation of Ohio Filed July 20, 1956, Ser. No. 599,195

4 Claims. (Cl. 18—12)

This invention relates generally as indicated to a sheeting die which is adapted to be coupled to the discharge port of an extruder and which is effective to continuously transform the extruded body of plasticized material, usually in generally cylindrical form, to sheet or strip form during the course of its flow through the sheeting die.

At the present time sheeting dies are provided with a cylindrical inlet passage that registers at one end with the extruder outlet and at the other end with a manifold from which the material is conducted transversely through a relatively thin passage co-extensive lengthwise with the manifold and thence into and through the die outlet slit, there usually being employed a so-called "choke bar" in the passage between the manifold and the outlet slit. Said choke bar usually is longitudinally warped or curved so as to equalize the flow of material as it approaches the outlet slit. It has also been proposed heretofore to employ instead of a manifold a fan-shaped passage that leads from the die inlet passage to the die outlet slit.

One difficulty encountered with these and other known types of sheeting dies, especially with dies for extruding sheets of great width, is that unless the parts forming the die outlet slit are extremely ruggedly built, they will be bowed or spread apart under the influence of the pressure of the plastic material acting on the large projected area of the outlet slit. This results from the prevalent practice of arranging the outlet slit, the choke passage and the manifold and passage (or fan-shaped passage) leading to the choke passage in a common plane usually coinciding with the parting line between the die supporting parts whereby said structure has a relatively deep throat as measured from the exit end of the outlet slit to the manifold or fan passage inlet about which the outlet pressure acts to bow or spread apart the outlet slit.

Accordingly, it is a primary aim of this invention to provide a novel form of sheeting die that eliminates such deep throat so that a much lighter die structure may be employed without occurrence of such bowing or spreading apart of the outlet slit.

Another aim of this invention is to provide a sheeting die which has a fan-shaped passage that follows a devious or sinuous path that brings the die inlet relatively close to but transversely offset from the die outlet slit, thereby eliminating the deep throat while yet uniform flow of plastic material is assured for uniform and continuous production of sheeted plastic material.

Yet another aim of this invention is to provide a sheeting die having a novel form of fine adjusting mechanism for adjusting the choke bar.

Yet another aim of this invention is to provide a sheeting die in which the parting line between mating fixed die and die support blocks is in a plane transverse to the inlet passage formed in said die support block.

Other objects and advantages of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
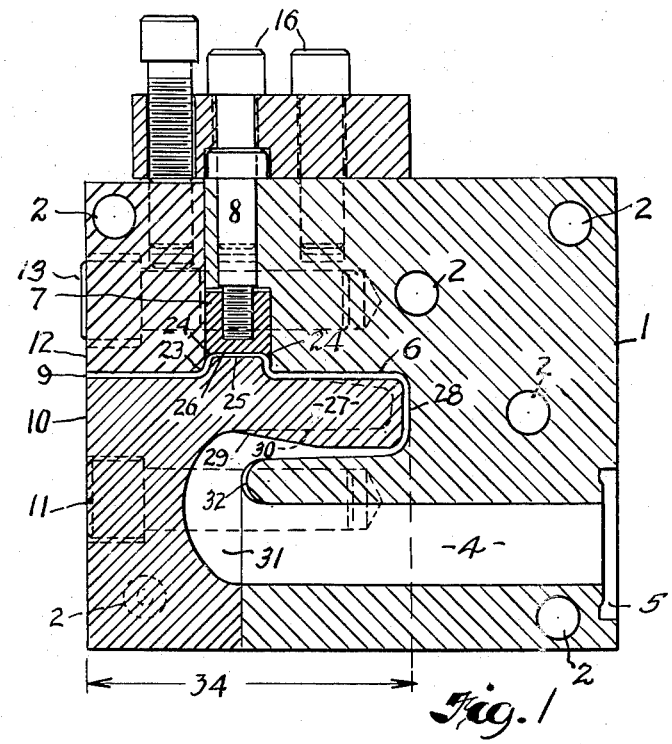
Fig. 1 is a transverse cross-section view through the middle of a preferred embodiment of this invention, such section having been taken in a vertical plane that contains the longitudinal axis of the transverse inlet passage.

Referring now more particularly to the drawings, the reference character 1 denotes an elongated die support block provided with several longitudinally extending holes 2 to accommodate electric heating cartridges 3 therein and with a die inlet passage 4 transversely through the middle of said block but below the longitudinal axis thereof. The rear face of said block 1 is recessed as shown at 5 for mounting to the discharge outlet of a plastic extruder (not shown) and the front face of said block 1 is formed with a longitudinally extending groove 6 having rounded external and internal corners located above the inlet passage 4, said groove being laterally enlarged to accommodate the longitudinally extending choke bar 7. Said choke bar 7 is adapted to be adjusted to longitudinally curved or warped form as by the series of socket head screws 8 which have threaded engagement with holes formed in said bar, such adjustment of the choke bar 7 being effective to equalize the flow of plastic material just before it enters the die outlet slit 9.

Figure 2:
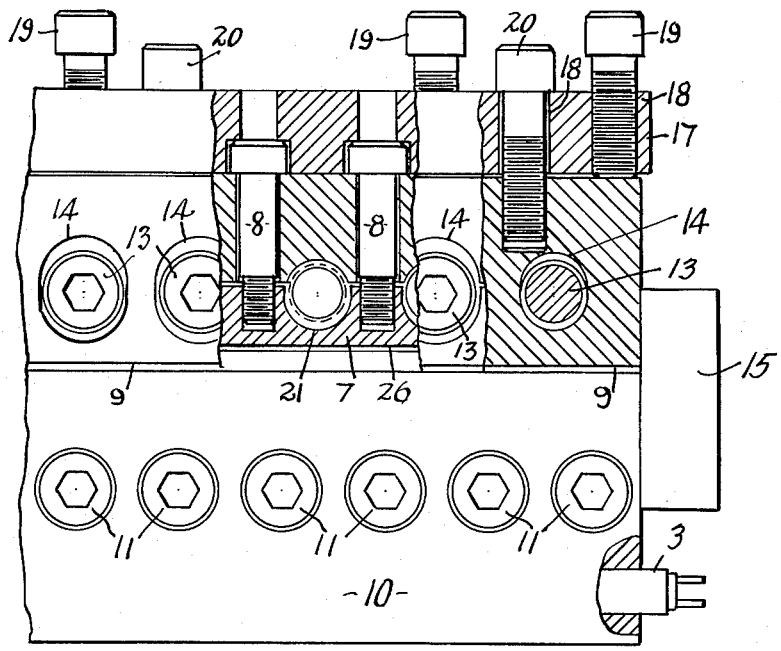
Fig. 2 is a fragmentary elevation view partly in cross-section as viewed from the left-hand side of Fig. 1.
Figure 4:
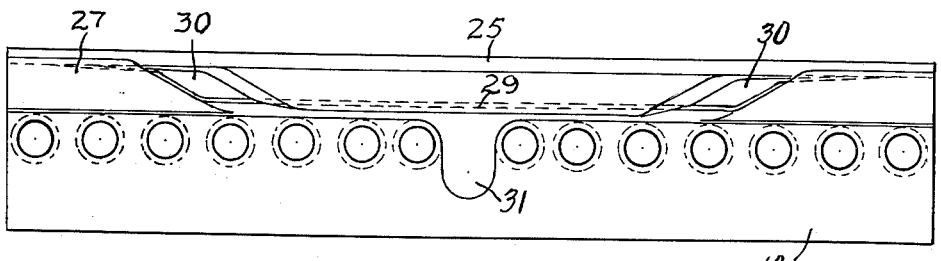
Figs. 4, 5 and 6 are rear elevation, top plan, and bottom plan views respectively of the fixed die block that cooperates with the die support block and the choke bar to provide a devious or sinuous zigzag passage between the die inlet passage and the die outlet slit.
Figure 5:
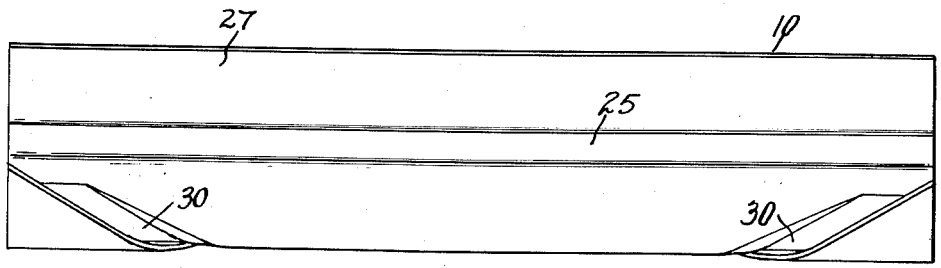
Figure 6:
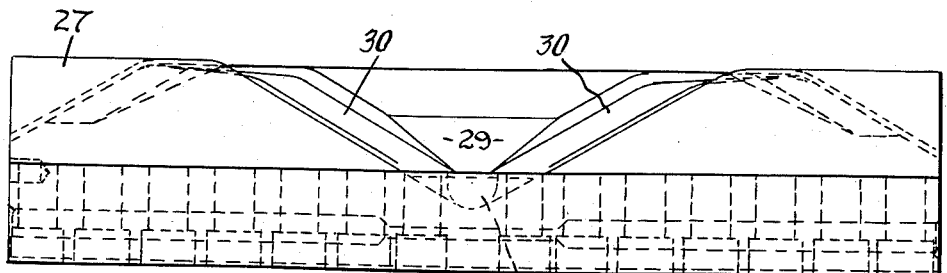

The outlet slit 9 is defined between opposed spaced apart surfaces of a fixed die block 10 which is clamped to the front face of said support block 1 as by screws 11 and of a vertically adjustable die block 12 which is clamped to the front face of the support block 1 as by screws 13. The counterbored holes 14 in said die block 12 for the shanks and heads of screws 13 are of oblong cross-section as best shown in Fig. 2 so as to permit vertical adjustment of said die block 12.

The ends of the die outlet slit 9 are closed as by means of end plates 15 which are bolted to the ends of the blocks 1 and 10.

Secured by screws 16 to the top face of the support block 1 is a longitudinally extending plate 17 which overlies the top face of the adjustable die block 12. The overhanging portion of said plate 17 is formed with a series of longitudinally spaced apart holes 18, alternate ones of which have stop or lock screws 19 threaded therethrough and adjusting screws 20 extending therethrough and threaded into holes formed in said die block 12. In order to effect adjustment of the thickness of the outlet slit 9, the screws 13 are loosened a slight amount and the stop screws 19 are also loosened so as to move the ends of the latter out of contact with the top of said die block 12. With the screws 13 and 19 thus loosened, the adjusting screws 20 may be turned to either raise or lower said die block 12 with respect to the fixed die block 10. When the die outlet slit 9 has thus been adjusted, the stop screws 19 and clamping screws 13 may be retightened to lock said die block 12 in the adjusted position.

It is to be noted that the choke bar 7 is formed with grooves 21 to clear the shanks of the clamping screws 13. Preferably, said choke bar 7 is of thickness substantially equal to the depth of the recess in which it is disposed so that it will have a sliding fit to prevent leakage of plastic material while at the same time is rendered adjustable independently of die block 12. However, if desired, said choke bar 7 may be a fraction of a thousandth of an inch thicker so that the same will be clamped in place between the support block 1 and the die block 12.

The bottom rear corner 23 of the die block 12 is rounded as shown and the bottom face of the choke bar 7 is formed with lips 24, said corner 23 and lips 24 providing for smooth flow of plastic material irrespective of the relative adjustments of die block 12 and choke bar 7 with respect to each other and with respect to the fixed die block 10. The die block 10 is formed with a longitudinally extending rib 25 having rounded internal and external corners and providing with the choke bar 7 an adjustable choke passage 26 that is located just ahead of the inlet to the outlet slit 9.

As best shown in Figs. 1 and 4–6, the fixed die block 10 is formed with an integral rearwardly extending tongue 27 which snugly fits into the groove 6 of the support block 1 and which defines with said groove what I prefer to call a "folded fan" passage 28 which is of progressively increasing width from the region 29 to the choke rib 25. The edges of said fan-shaped passage 28 are formed with channels 30 to promote the flow of plastic material therealong and thus equalize the flow of the material toward the die outlet slit 9. The rear face of said die block 10 below the tongue 27 is recessed as at 31 to provide a U-shaped or rebent passage that registers with the inlet passage 4 and provides for smooth flow of the plastic material during the course of its flow from the inlet passage 4 into the fan-shaped passage 28.

Viewed in cross-section, the passages 31 and 28 extending from the inlet passage 4 to the choke passage 26 or to the die outlet slit 9 is of a devious or sinuous or generally zigzag form so as to materially contribute to the rigidity of the die assembly with reference to bowing of the outlet slit 9 while yet the support block 1 and the die blocks 10 and 12 need not be "beefed up" as compared with prior art structures wherein the outlet slit, the choke passage, and a flat fan passage are disposed in a common plane. In such prior art structures, the entire projected rectangular areas of the outlet slit and choke passage and the entire projected triangular area of the flat fan passage are exposed to the pressure of the plastic material tending to spread apart or bow said passages.

In the present case, the folding of the fan passage 28 altogether eliminates some of the spreading forces, particularly at that portion of the fan passage 28 which is defined between the end of the tongue 27 and the bottom of the groove 6 while others of the spreading forces are materially reduced in magnitude. It can be said that the forces on the top and bottom sides of the tongue 27 are partially balanced. Likewise, because groove 6 is relatively shallow and because it is formed in a unitary block 1, the spreading or bowing effect by pressure of the plastic material is minimized.

With further reference to the passages herein, starting in the region 29, the fan passage becomes progressively wider and thinner and then remains substantially constant in thickness to the choke passage 26 except for the provision of the relatively thicker edge channels 30.

In summary, the provision of a devious or sinuous passage brings the inlet passage 4 forward practically to the rear portion of the outlet slit 9 and underneath the choke passage 26 to thus materially reduce the throat depth as indicated by the dimension line 34. Thus, I have provided a strong but lightweight die assembly through which plastic material may be expressed to produce sheets having uniform characteristics. The passages through the die assembly are well enough rounded to eliminate sharp internal or external corners at which heat sensitive materials would hang up and thereby be burned, charred, decomposed or discolored.

Figure 7:
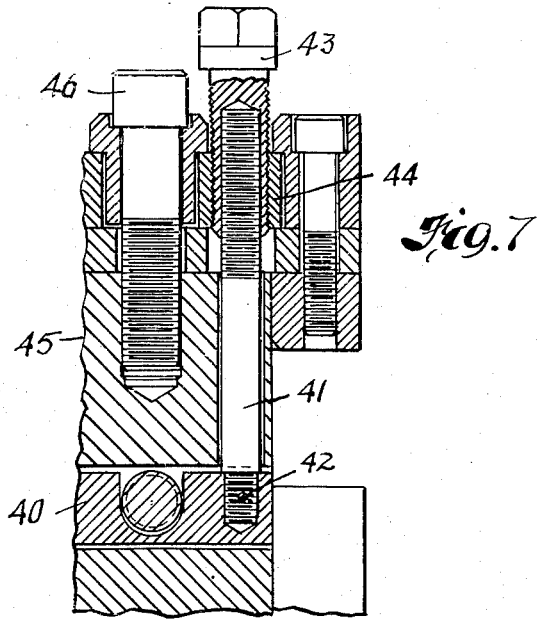
Fig. 7 is a vertical cross-section view showing a novel form of choke bar adjusting mechanism.
Figure 3:
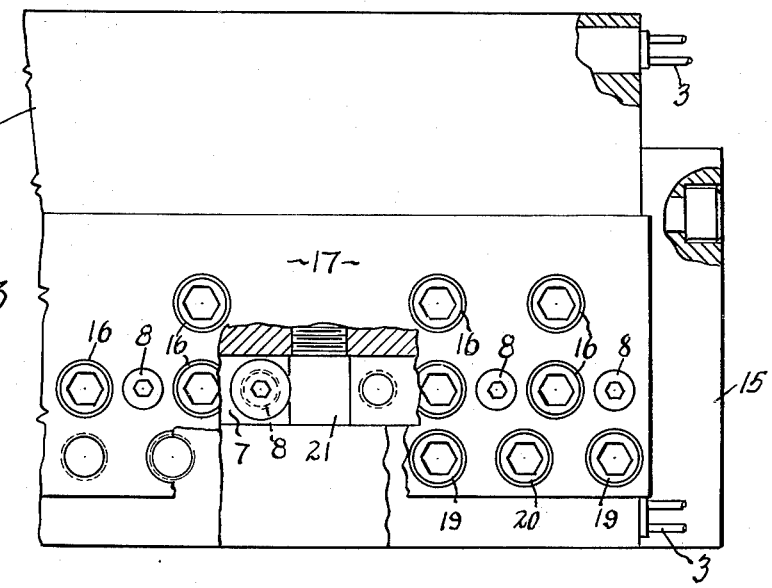
Fig. 3 is a fragmentary top plan view partly in cross-section as viewed from the top of Fig. 2.

Referring now to Fig. 7, the die assembly is generally the same as that shown in Figs. 1–6 except that provision is made for fine accurate adjustment of the choke bar 40 by means of upstanding studs 41 that are pinned against rotation by pins 42 and that have threaded engagement in adjusting screws 43. In turn, the adjusting screws 43 are threaded into the top plate 44, the latter being fixed to the die support block 45 by means of the screws 46. The threads aforesaid have different pitches with the coarser threads being formed on the screws 43 and plate 44 whereby the choke bar 40 will be moved a distance in accordance with the difference in pitches between said coarser threads and the finer threads of studs 41. If desired, an equivalent fine adjustment mechanism may be provided in connection with the adjustable die block (not shown in Fig. 7).

Other modes of applying the principle of the invention may be employed, change being made as regards the details described, provided the features stated in any of the following claims or the equivalent of such be employed.

I therefore particularly point out and distinctly claim as my invention:

1. A sheeting die comprising a body formed with an inlet passage for plastic material, a pair of die blocks secured to said body and defining therebetween an outlet slit, one die block and said body being formed with an interfitting tongue and groove parallel to said outlet slit which, in a plane transverse to said outlet slit and passing through said inlet passage and said outlet slit, form a sinuous passage through which the plastic material flows from said inlet passage to said outlet slit, said sinuous passage being of progressively increasing width and of progressively decreasing thickness from said inlet passage to said outlet slit.

2. A sheeting die comprising an elongated horizontally extending body formed with a horizontal inlet passage transversely therethrough for flow of plastic material therethrough from one end to the other and with a horizontal longitudinally extending groove vertically offset with respect to said inlet passage, a first die block secured to said body and formed with a recessed face that forms a rebent passage communicating such other end of said inlet passage with said groove, said first die block also being formed with a horizontal tongue that extends into said groove to define therewith an oppositely rebent passage communicating with said recessed face, and a second die block forming with said first die block a horizontal outlet slit that communicates with such oppositely rebent passage whereby the plastic material follows a devious course from said inlet passage to said outlet slit to minimize the throat depth of said die as measured horizontally in a vertical plane which passes through said outlet slit and through said inlet passage and thus minimizes the tendency of bowing of said outlet slit under the influence of pressure of plastic material therein, such oppositely rebent passage being of folded fan-shape of progressively increasing width and of progressively decreasing thickness toward said outlet slit.

3. A sheeting die for plastic material formed with an inlet passage, a die outlet slit, and a devious connecting passage through which plastic material is adapted to flow from said inlet passage to said outlet slit, said connecting passage having at least one U-bend therein in a plane transverse to said outlet slit and passing through said outlet slit and through said inlet passage effective to materially reduce the moment arm about which the pressure of plastic material acts in tending to bow said outlet slit, said connecting passage being of progressively increasing width and of progressively decreasing thickness from said inlet passage to said outlet slit.

4. A sheeting die for plastic material formed with an inlet passage, a die outlet slit, and a relatively long but devious connecting passage through which plastic material is adapted to flow from said inlet passage to said outlet slit, said connecting passage having at least one U-bend passage portion therein in a plane transverse to said outlet slit and passing through said outlet slit and through said inlet passage of which the end of one leg constitutes an extension of said inlet passage and of which the end of the other leg is laterally offset from said inlet passage, said connecting passage further having an angular passage portion which extends generally laterally from the end of such other leg and thence generally longitudinally to said die outlet slit and which is of progressively increasing width and of progressively decreasing thickness toward said outlet slit, said devious connecting passage being effective to substantially decrease the moment arm about which the pressure of plastic material acts in tending to bow said outlet slit as compared with the moment arm which would result from straightening the U-bend and angular passage portions between said die outlet slit and said inlet passage.

References Cited in the file of this patent

UNITED STATES PATENTS

| | | |
|---|---|---|
| 1,717,620 | Page | June 18, 1929 |
| 2,405,039 | Jesionowski | July 30, 1946 |
| 2,479,804 | Bailey et al. | Aug. 23, 1949 |
| 2,514,211 | Carlson | July 4, 1950 |
| 2,688,154 | Huckfeldt | Sept. 7, 1954 |
| 2,734,224 | Winstead | Feb. 14, 1956 |
| 2,813,301 | Underwood | Nov. 19, 1957 |

FOREIGN PATENTS

| | | |
|---|---|---|
| 706,323 | Great Britain | Mar. 4, 1950 |